United States Patent
Gu

(10) Patent No.: US 11,669,234 B2
(45) Date of Patent: Jun. 6, 2023

(54) METHOD FOR PROCESSING AERIAL VIEW, ELECTRONIC DEVICE, AND STORAGE MEDIUM

(71) Applicant: Beijing Hitevision Aixue Education Technology Co., Ltd., Beijing (CN)

(72) Inventor: Jinbo Gu, Beijing (CN)

(73) Assignee: Beijing Hitevision Aixue Education Technology Co., Ltd., Beijing (CN)

( * ) Notice: Subject to any disclaimer, the term of this patent is extended or adjusted under 35 U.S.C. 154(b) by 33 days.

(21) Appl. No.: 17/577,429

(22) Filed: Jan. 18, 2022

(65) Prior Publication Data
US 2023/0119974 A1    Apr. 20, 2023

(30) Foreign Application Priority Data
Oct. 18, 2021  (CN) .......................... 202111210123.4

(51) Int. Cl.
*G06F 3/048* (2013.01)
*G06F 3/04845* (2022.01)
*G06F 3/0488* (2022.01)

(52) U.S. Cl.
CPC ........ *G06F 3/04845* (2013.01); *G06F 3/0488* (2013.01)

(58) Field of Classification Search
CPC ............................ G06F 3/04845; G06F 3/0488
See application file for complete search history.

(56) References Cited

U.S. PATENT DOCUMENTS

| 8,164,690 | B2 * | 4/2012 | Fukui | ................... H04N 21/812 348/739 |
|---|---|---|---|---|
| 2003/0165255 | A1 * | 9/2003 | Yanagawa | ................. G06T 3/00 382/104 |
| 2010/0026873 | A1 * | 2/2010 | Lee | ......................... H04N 5/272 348/333.05 |
| 2013/0222666 | A1 * | 8/2013 | Rydenhag | ............. H04N 23/635 348/333.02 |
| 2022/0011929 | A1 * | 1/2022 | Han | .................... H04N 21/4316 |

FOREIGN PATENT DOCUMENTS

| CN | 111026316 A | 4/2020 |
| CN | 111957041 A | 11/2020 |
| CN | 112533021 A | 3/2021 |

* cited by examiner

*Primary Examiner* — Linh K Pham
(74) *Attorney, Agent, or Firm* — East IP P.C.

(57) ABSTRACT

The disclosed embodiments provides a method for processing an aerial view, an electronic device, and a storage medium. The method includes: receiving a first touch-operation instruction directed at a main image on a display screen; determining whether a first touch track corresponding to the first touch-operation instruction enters a blocking-sensable region; when the first touch track does not enter the blocking-sensable region, providing an aerial view of the main image in a first aerial view region for display; when the first touch track enters the blocking-sensable region, moving the aerial view from the first aerial view region to a second aerial view region for display, or hiding the aerial view. With the above method, the influence of the interface elements on the display effect can be flexibly eliminated, and the blocking effect can be reduced.

19 Claims, 3 Drawing Sheets

METHOD FOR PROCESSING AERIAL VIEW, ELECTRONIC DEVICE, AND STORAGE MEDIUM

CROSS-REFERENCE TO RELATED APPLICATION

This application claims priority to Chinese Patent Application No. 202111210123.4, filed on Oct. 18, 2021, which is incorporated hereby by reference in its entirety.

TECHNICAL FIELD

The disclosed embodiments relates to the technical field of large-screen display devices, and particularly relates to a method for processing an aerial view, an electronic device, and a storage medium.

BACKGROUND

A digital interactive large-screen display device is one of the necessary equipment for information-based teaching. The digital interactive large-screen display device is a combination of traditional blackboard-based teaching with modern electronic information technology, which can provide a variety of convenient and flexible interactive display functions in education and teaching.

In some application scenarios, a user will magnify an image displayed by the digital interactive large-screen display device. When the image exceeds the size of the screen, the full view of the actual image cannot be seen, which makes it hard to move the image. For ease of moving the image to show details of the image in different orientations to the students, the user interface may provide an aerial view. Similarly to a map, the aerial view is used for displaying the entire miniature of the image. However, a certain screen area will be occupied by the aerial view, which blocks the image and sometimes causes inconvince for the user's touch operation.

SUMMARY

In view of the above, a purpose of the disclosed embodiments is to provide a method for processing an aerial view, an electronic device, and a storage medium.

For the above purpose, in a first aspect, the disclosed embodiments provides a method for processing an aerial view, where the method includes:
  receiving a first touch-operation instruction directed at a main image on a display screen;
  determining whether a first touch track corresponding to the first touch-operation instruction enters a blocking-sensable region;
  providing an aerial view of the main image in a first aerial view region for display when the first touch track does not enter the blocking-sensable region;
  moving the aerial view from the first aerial view region to a second aerial view region for display or hiding the aerial view when the first touch track enters the blocking-sensable region;
  where the blocking-sensable region includes the first aerial view region.

For the above purpose, in a second aspect, the disclosed embodiments further provides an apparatus for processing an aerial view, where the apparatus includes:
  an interface circuitry configured to receive a first touch-operation instruction directed at a main image on a display screen;
  a processor coupled with the interface circuitry and configured to:
    determine whether a first touch track corresponding to the first touch-operation instruction enters a blocking-sensable region;
    provide an aerial view of the main image in a first aerial view region for display when the first touch track does not enter the blocking-sensable region; and
    move the aerial view from the first aerial view region to a second aerial view region for display or hide the aerial view when the first touch track enters the blocking-sensable region;
  where the blocking-sensable region comprises the first aerial view region.

For the above purpose, in a third aspect, the disclosed embodiments further provides a non-transitory computer-readable medium including instructions stored thereon, wherein the instructions, when executed by a processor, causes the processor to:
  determine whether a first touch track enters a blocking-sensable region, the first touch track corresponding to a first touch-operation instruction directed at a main image on a display screen;
  provide an aerial view of the main image in a first aerial view region for display when the first touch track does not enter the blocking-sensable region; and
  move the aerial view from the first aerial view region to a second aerial view region for display or hiding the aerial view when the first touch track enters the blocking-sensable region;
  where the blocking-sensable region comprises the first aerial view region.

BRIEF DESCRIPTION OF THE DRAWINGS

In order to explain the technical solutions of the disclosed embodiments or the related technologies more clearly, the accompanying drawings which are used in the description of the embodiments or the related technologies will be briefly described below. Apparently, the drawings described below are merely some embodiments of the disclosed embodiments, a person of ordinary skill in the art can obtain other drawings according to the accompanying drawings without involving any inventive effort.

DETAILED DESCRIPTION

The objects, technical solutions and advantages of the disclosed embodiments will become more apparent from the following detailed description when taken in conjunction with the accompanying drawings.

It is noted that, unless otherwise defined, technical or scientific terms used in the embodiments of the disclosed embodiments shall have the ordinary meaning as understood by one of ordinary skill in the art to which the disclosed embodiments belongs. The use of the terms "first", "second", and the like in the embodiments herein does not denote any order, quantity, or importance, but rather is used to distinguish one element from another. The word "including" or "including", and the like, means that an element or item preceding the word covers the element or items listed after the word and equivalents thereof, but does not exclude other elements or items. The words "connected" or "coupled" and the like are not limited to physical or mechanical connections, but may include electrical connections, whether direct or indirect. The terms "upper", "lower", "left", "right", and the like are used only to indicate relative positional relationships that may change accordingly when the absolute position of the object being described changes.

In an aspect, embodiments of the disclosed embodiments provide a method of processing an aerial view.

Figure 1:
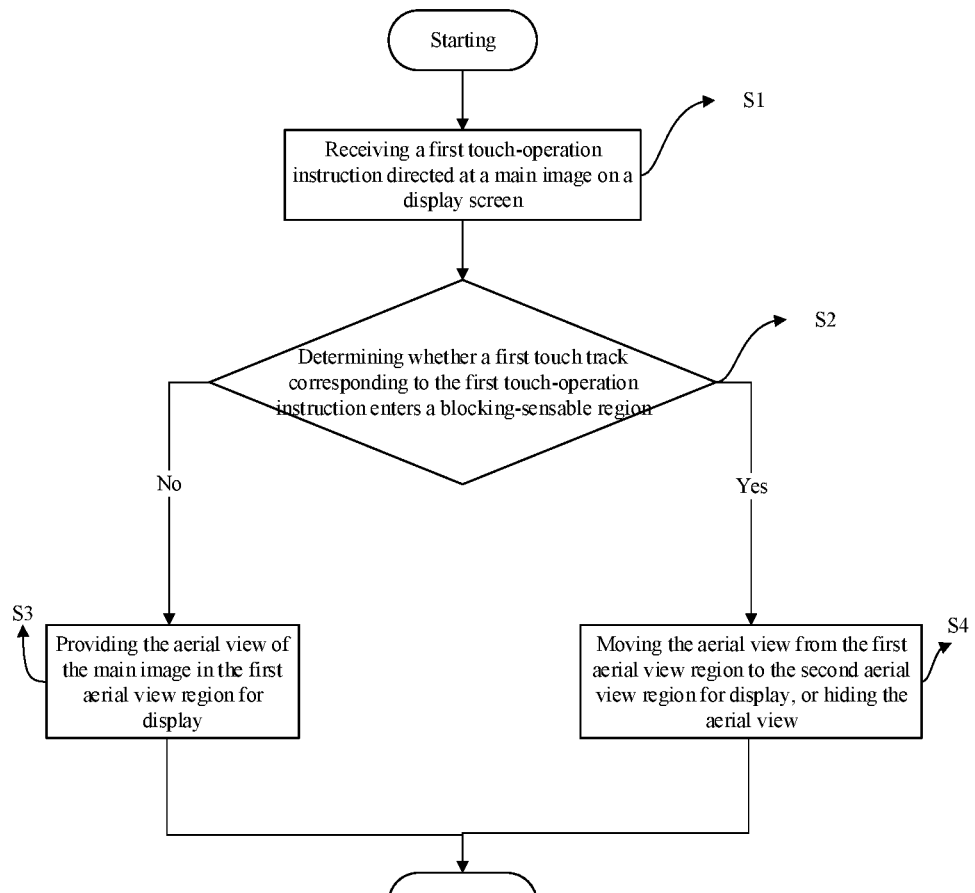
FIG. 1 is a schematic diagram of a method for processing an aerial view according to an embodiment of the disclosed embodiments.

As shown in FIG. 1, a method for processing an aerial view according to one or more optional embodiments of the disclosed embodiments includes steps S1 to S4.

At S1, a first touch-operation instruction directed at a main image on a display screen is received.

Figure 2:
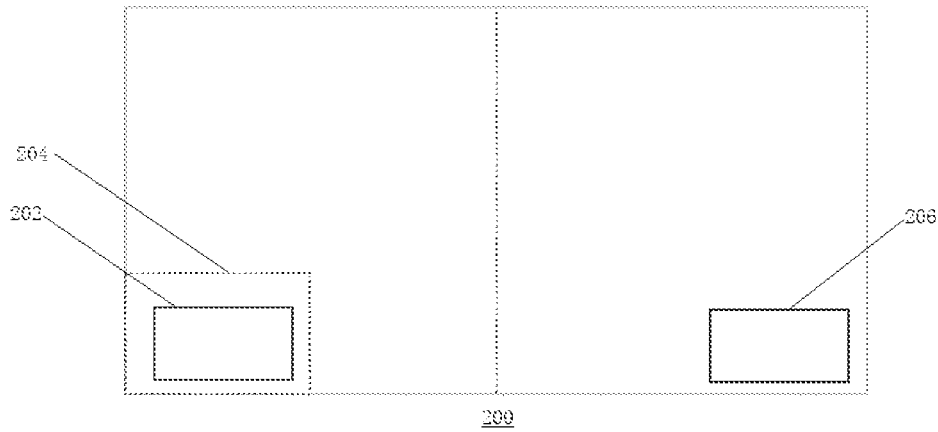
FIG. 2 is a schematic diagram of a display screen in the method for processing the aerial view according to an embodiment of the disclosed embodiments.

As shown in FIG. 2, the display screen 200 is configured to display the main image. A touch operation may be performed on the main image by inputting the first touch-operation instruction on the display screen 200. The first touch-operation instruction may be, for example, an operation of zooming in, zooming out on the main image, moving the main image, framing part of the main image, or adding marks, notes or the like on the main image.

At S2, it is determined whether a first touch track corresponding to the first touch-operation instruction enters a blocking-sensable region 204.

The first touch track corresponding to the first touch-operation instruction is a touch track formed during the touch operation performed on the main image. In some scenarios, the first touch track is a pre-set operation gesture, for example, a zoom-in gesture, a zoom-out gesture, a move gesture, etc. The zoom-in gesture is taken as an example for illustration. The zoom-in gesture is used to zoom in on a partial main image in the main image. The first touch track corresponding to the zoom-in gesture is in the partial main image to be zoomed-in on. If the first touch track does not enter the blocking-sensable region, the aerial view will not block the partial main image after it is zoomed-in on. Otherwise, it is possible that the aerial view may block the partial main image. In other scenarios, the first touch track is handwriting written by the user in a process of, for example, framing part of the main image, adding marks, notes or the like on the main image. In these scenarios, the first touch track is displayed. If the first touch track does not enter the blocking-sensable region, the aerial view will not block the first touch track. Otherwise, it is possible that the aerial view may block the first touch track.

The blocking-sensable region 204 includes a first aerial view region 202 for displaying the aerial view of the main image. That is, the blocking-sensable region 204 has the first aerial view region 202 contained therein, and an area of the blocking-sensable region 204 is slightly larger than or equal to an area of the first aerial view region 202. FIG. 2 shows the case where the area of the blocking-sensable region 204 is slightly larger than the area of the first aerial view region 202.

In the case where the area of the blocking-sensable region 204 is equal to the area of the first aerial view region 202, the blocking-sensable region 204 and the first aerial view region 202 exactly completely overlap. By determining whether the first touch track enters the blocking-sensable region 204, it can be determined whether the aerial view blocks the main image obtained after the touch operation. The main image obtained after the touch operation includes the first touch track that is displayed on the main image. For example, the main image obtained after the touch operation includes a track of framing or annotations on part of the main image.

In a case where the area of the blocking-sensable region 204 is slightly larger than the area of the first aerial view region 202 (as shown in FIG. 2), when the first touch track enters the blocking-sensable region, the first touch track is likely to enter the first aerial view region 202 in accordance with the trend of the first touch track, and it is possible that the aerial view may block the main image obtained after the touch operation. Therefore, it can be determined whether the aerial view may block the main image obtained after the touch operation by determining whether the first touch track enters the blocking-sensable region 204.

At S3, when the first touch track does not enter the blocking-sensing region 204, the aerial view of the main image is provided in the first aerial view region 202 for display.

That the first touch track does not enter the blocking-sensable region 204 means that the touch operation occurs in other regions of the display screen, and to provide the aerial view of the main image in the first aerial view region 202 for display does not affect the touch operation. The first aerial view region 202 may be an initial display region or a default display region for the aerial view.

S4: when the first touch track enters the blocking-sensable region 204, the aerial view is moved from the first aerial view region 202 to the second aerial view region 206 for display, or the aerial view is hidden.

When the first touch track enters the blocking-sensable region 204, it means that the aerial view displayed in the first aerial view region 202 may block the main image obtained after the touch operation, or there is a possibility that first aerial view region 202 may block the main image obtained after the touch operation. It is not desired to continue displaying the aerial view in the first aerial view region 202, and in this case, the aerial view is moved to the second aerial view region 206 for display.

As shown in FIG. 2, the second aerial view region 206 is provided in a region of the display screen 200 other than the blocking-sensing region 204. The positions of the first aerial view region 202 and the second aerial view region 206 at the lower left corner and the lower right corner of the screen are shown for illustration, and the positions of the first aerial view region 202 may be flexibly arranged, for example, at the upper left corner or the upper right corner, near the middle of the left side of the display screen 200, or to the left of the central axis (dashed line in FIG. 2) of the display screen 200. The second aerial view region 206 may be arranged on the other side of the display screen 200 with respect to the first aerial view region 202, or the second aerial view region 206 and the first aerial view region 202 may be arranged at two diagonal positions on a diagonal of the display screen 200, or the like.

In some other embodiments, if the first touch track enters the blocking-sensable region 204, the aerial view may be hidden to avoid the situation that the aerial view blocks the main image obtained after the touch operation.

It can be seen that, in the method processing the aerial view is provided by the disclosed embodiments, firstly, the first touch-operation instruction directed at the main image on the display screen 200 is received, and whether the first touch track corresponding to the first touch-operation instruction enters the blocking-sensable region 204 is determined. When the first touch track does not enter the blocking-sensable region 204, the aerial view of the main image is provided in the first aerial view region 202 for display, and when the first touch track enters the blocking-sensable region 204, the aerial view is moved from the first aerial view region 202 to the second aerial view region 206 for display, or the aerial view is hidden. The first aerial view region 202 is used for display the aerial view in the initial situation. The blocking-sensable region 204 is configured to include the first aerial view region 202, that is, the blocking-sensable region 204 has the first aerial view region 202 contained therein. It can be determined whether the aerial view blocks the main image obtained after the touch operation by determining whether the first touch track enters the blocking-sensable region. If the first touch track enters the blocking-sensable region, it means that the aerial view may block the main image obtained after the touch operation. In this case, the aerial view is moved to another region (that is, the second aerial view region 206) for display, or the aerial view is hidden. With this method, the influence of the aerial view elements in the display screen on the touch operation and the display effect for main image can be flexibly eliminated, and the blocking effect can be flexibly reduced.

Figure 3:
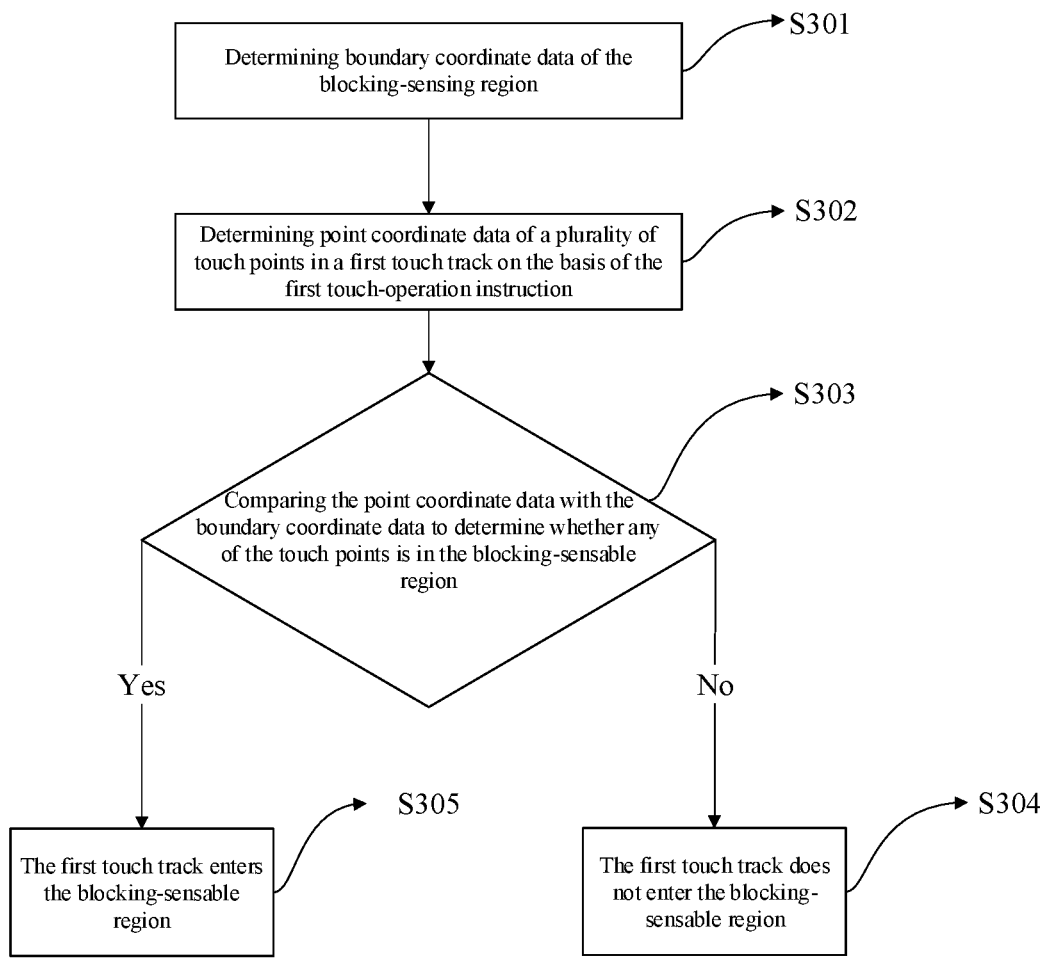
FIG. 3 is a schematic diagram of a method for determining whether the first touch track enters the blocking-sensable region in the method for processing the aerial view according to an embodiment of the disclosed embodiments.

As shown in FIG. 3, in the method for processing the aerial view according to an optional embodiment of the disclosed embodiments, the determining whether the first touch track corresponding to the first touch-operation instruction enters the blocking-sensable region further includes steps S301 to S305.

At S301, boundary coordinate data of the blocking-sensing region 204 are determined.

A rectangular coordinate system may be established by selecting a reference point on the display screen 200 as the origin, so that all the points on the display screen 200 can be represented by coordinate data. For example, the lower left vertex of the display screen 200 may be taken as the origin, the straight line of the lower side edge may be taken as the X-axis, and the straight line of the left side edge may be taken as the Y-axis. Thus, the boundary coordinate data of the blocking-sensable region 204 can be determined. The boundary coordinate data includes coordinate data of all the boundary points of the blocking-sensable region 204. The important coordinates in the boundary coordinate data are the four vertex coordinates of the blocking-sensable region 204, which may be respectively expressed as (0,0), (0, $s_y$), ($s_x$, 0), ($s_x$, $s_y$). Thus, it can be determined that an X-axis coordinate range of the blocking-sensable region 204 is [0, $s_x$], and a Y-axis coordinate range of the blocking-sensable region 204 is [0, $s_y$]. The boundary coordinate data also includes the X-axis coordinate range [0, $s_x$] and the Y-axis coordinate range [0, $s_y$] of the blocking-sensing region 204.

At S302, point coordinate data of a plurality of touch points in a first touch track is determined on the basis of the first touch-operation instruction.

Similarly, point coordinate data of a plurality of touch points of the first touch track can be determined in the rectangular coordinate system of the display screen 200, and the point coordinate data of a touch point may be expressed as ($c_x$, $c_y$).

At S303, the point coordinate data is compared with the boundary coordinate data to determine whether any of the touch points is in the blocking-sensable region.

An X-axis coordinate and a Y-axis coordinate in point coordinate data of a touch point may be respectively compared with the X-axis coordinate range [0, $s_x$] and the Y-axis coordinate range [0, $s_y$] of the blocking-sensable region 204. If the X-axis coordinate of the touch point falls within the X-axis coordinate range [0, $s_x$] and the Y-axis coordinate of the touch point falls within the Y-axis coordinate range [0, $s_y$], then it can be determined that the touch point ($c_x$, $c_y$) falls within the blocking-sensable region 204, and at least one of the touch points is in the blocking-sensable region 204.

At S304, when none of the touch points is in the blocking-sensable region, it is determined that the first touch track does not enter the blocking-sensable region.

At S305, when at least one of the touch points is in the blocking-sensable region, it is determined that the first touch track enters the blocking-sensable region.

In the above embodiment, whether the first touch track enters the blocking-sensable region is determined by comparing the point coordinate data of the touch points in the first touch track with the boundary coordinate data of the blocking-sensable region. Since the boundary coordinate data of the blocking-sensable region can define the blocking-sensable region and a non-blocking sensable region, whether the first touch track enters the blocking-sensable region can be accurately determined with the above method.

In other embodiments, the comparison with the boundary coordinate data may be performed each time one touch point is generated, so that the aerial view can be moved when any one of the touch points in the first touch track starts to enter the blocking-sensable region, so as to avoid blocking.

Figure 4:
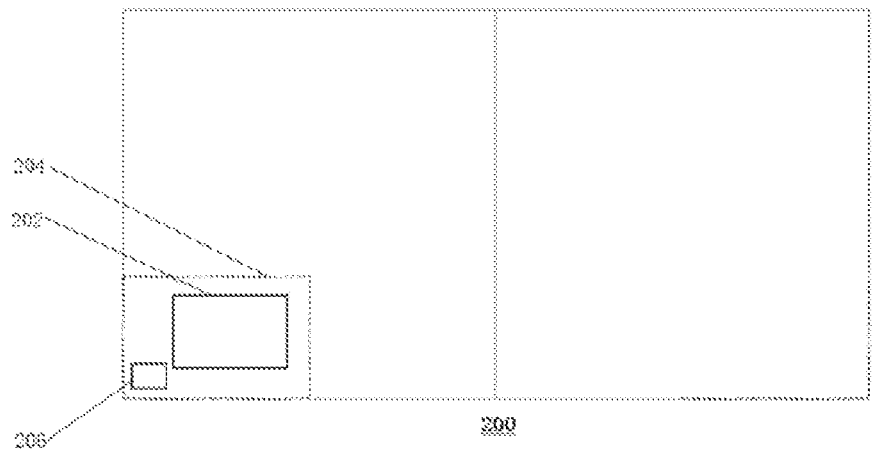
FIG. 4 is another schematic diagram of a display screen in the method for processing the aerial view according to an embodiment of the disclosed embodiments.

As shown in FIG. 4, in some optional embodiments of the disclosed embodiments, the second aerial view region 206 may be arranged in the blocking-sensing region 204, the second aerial view region 206 is smaller in size than the first aerial view region 202. The size of the aerial view is adjusted to match the size of the second aerial view 206 during the movement of the aerial view from the first aerial view region 202 to the second aerial view region 206.

The process of moving the aerial view from the first aerial view region 202 to the second aerial view region 206 may be shown in an animated form.

In the method for processing the aerial view according to an optional embodiment of the disclosed embodiments, the displaying the aerial view from the first aerial view region to the second aerial view region further includes:

determining a movement path of a center point of the aerial view, where a center point of the first aerial view is taken as a starting point and a center point of the second aerial view is taken as an end point of the movement path.

In some optional embodiments, a Key point such as an upper right vertex, an upper left vertex, a lower right vertex, or a lower left vertex may be selected as a positioning anchor points for the movement of the aerial view. The positioning anchor point for the movement is used for the positioning of the aerial view during the movement of the aerial view, and the specific position of the aerial view can be determined by determining the position of one point in the aerial view. For example, when the upper right vertex is selected as the positioning anchor point for the movement, the movement path of the upper right vertex of the aerial view is determined with the upper right vertex of the first aerial view region and the upper right vertex of the second aerial view region being the starting point and the end point respectively, where the upper right vertex of the aerial view is always located in the movement path during the movement of the aerial view. Similarly, when the upper left vertex is taken as the positioning anchor point for the movement, the upper left vertex of the aerial view is always located in the movement path. Which key vertex is specifically selected as the positioning anchor point for the movement can be flexibly set according to actual situations.

A movement animation is created for the aerial view on the basis of the moving path. The movement animation includes a plurality of animation frames. A display position of the aerial view in each of the animation frames is different, but the centre point of the aerial view in the plurality of the animation frames are all located in the moving path, that is to say, the movement of the aerial view is animated as moving from the first aerial view region to the second aerial view region along the moving path.

The animation frame time difference between each two adjacent animation frames is the same. The movement distance of the center point of the aerial view during the same animation frame time difference is the same. That is, the center points of the aerial view in the plurality of animation frames are equidistantly distributed in the movement path.

The movement distance of center points of the aerial view in two adjacent animation frames is determined on the basis of a movement animation duration and an animation frame time difference:

$$l = \frac{\Delta t}{T} L,$$

where l represents the movement distance, $\Delta t$ represents the animation frame time difference, T represents the movement animation duration, and L represents the total length of the movement path. During the animation frame time difference between two adjacent animation frames, the display screen may, in response to the first touch-operation instruction, perform a corresponding operation or adjustment on the main image, so that the display screen can respond to the first touch-operation instruction in time, and the main functions of the display screen will not be affected by the movement animation.

For example, the movement animation duration T may be set to 0.3 s, the animation frame time difference $\Delta t$ may be set to 30 ms, and the movement distance of the center points of the aerial view in two adjacent animation frames is:

$$l = \frac{30 \text{ ms}}{0.3 \text{ s}} L = \frac{30 \text{ ms}}{300 \text{ ms}} L = 0.1 \text{ L}.$$

The size of the aerial view is adjusted during the movement of the aerial view. The adjustment is shown in the movement animation, where the size of the aerial view in the plurality of animation frames can be reduced according to a predetermined reduction ratio or reduced according to a pre-set reduction difference. That is to say, the size data of the aerial view in the plurality of animation frames constitute an arithmetic sequence or a geometric sequence.

A reduction ratio φ is predetermined, such that the size of the aerial view in each of the animation frames is the size of the aerial view in the previous animation frame multiplied by the predetermined reduction ratio φ. There are a total number of n animation frames in the movement animation. From the second frame to the last frame, the size of the aerial view is reduced (n−1) times compared to the initial size. Finally, when the aerial view is moved to the second aerial view region 206, the size of the aerial view region 206 is $φ^{n-1}$ times the size of the first aerial view region 202. The value of the predetermined reduction ratio can be flexibly set according to actual situations.

A reduction difference ρ is predetermined, the size of the aerial view in each of the animation frames is the size of the aerial view in the previous animation frame minus the predetermined reduction difference ρ. There are a total number of n animation frames in the movement animation. From the second frame to the last frame, the size of the aerial view is reduced (n−1) times compared to the initial size. Finally, when the aerial view is moved to the second aerial view region 206, the size of the aerial view is the initial size minus ρ(n−1).

In some optional embodiments, the size data of the aerial view in the plurality of animation frames may be set according to a predetermined descending sequence. For example, the predetermined descending sequence may be (1.00, 0.98, 0.94, 0.88, 0.80, 0.70, 0.58, 0.44, 0.42, 0.40). The specific size proportion data in the preset descending sequence may be flexibly set according to the actual animation, so as to make the visual effect of the reduction process of the aerial view better during the entire animation.

In the method for processing the aerial view, after the movement of the aerial view, the aerial view may be restored to the first aerial view region for display. In the method for processing the aerial view according to an optional embodiment of the disclosed embodiments, after moving the aerial view from the first aerial view region to the second aerial view region, the method further includes the following steps:

receiving a second touch-operation instruction directed at the main image, and determining a corresponding second touch track;

when the second touch track does not enter the blocking-sensable region, moving the aerial view from the second aerial view region to the first aerial view region for display;

adjusting the size of the aerial view to match the size of the first aerial view when moving the aerial view.

The process of moving the aerial view from the second aerial view region 206 to the first aerial view region 202 may also be shown in animated form. In the corresponding movement animation, the start point of the moving path is the center point of the second aerial view region 206, and the end point is the center point of the first aerial view region 202.

Similarly, in some optional embodiments, a key point such as an upper right vertex, an upper left vertex, a lower right vertex, or a lower left vertex may be selected as a positioning anchor for the movement of the aerial view to determine a movement path for moving the aerial view from the second aerial view region to the first aerial view region.

Similarly, in a movement animation in which the aerial view is moved from the second aerial view region 206 to the first aerial view region 202. The animation frame time difference between each two adjacent animation frames is the same. The movement distance between the center points of the aerial view during the same animation frame time difference is the same. That is, the center points of the aerial view in the plurality of animation frames are equidistantly distributed in the movement path.

The size of the aerial view is adjusted during the movement of the aerial view. The adjustment is shown in the movement animation, where the size of the aerial view in the plurality of animation frames can be increased according to a predetermined reduction ratio or increased according to a predetermined increase difference. That is to say, the size data of the aerial view in the plurality of animation frames constitute an arithmetic sequence or a geometric sequence. After the aerial view is enlarged through the plurality of animation frames, when the aerial view is moved to the first aerial view region for display, the size of the aerial view matches the size of the first aerial view region.

In some embodiments, the size data of the aerial view in the plurality of animation frames in the movement animation of moving the aerial view from the second aerial view region 206 to the first aerial view region 202 may be set according to a predetermined ascending sequence. For example, the predetermined ascending sequence may be (0.40, 0.42, 0.48, 0.54, 0.62, 0.72, 0.84, 0.98, 0.99, 1.00). The specific size ratio data in the predetermined ascending sequence may be flexibly set according to the actual animation, so as to make the visual effect of the enlarging process of the aerial view better during the entire animation.

In the method for processing the aerial view, after the movement of the aerial view, the aerial view may be restored to the first aerial view region for display. After the movement of the aerial view from the first aerial view region to the second aerial view region, the method for processing the aerial view according to an optional embodiment of the disclosed embodiments further includes the following steps:
  receiving a touch-move instruction directed at the aerial view, and determining a corresponding touch-move direction, where a touch operation corresponding to the touch-move instruction directed at the aerial view is to press at the position of the aerial view and drag the aerial view, and the touch-move direction corresponding to the touch-move instruction is the direction in which the aerial view is dragged;
  when the touch-move direction is from the second aerial view region to the first aerial view region, moving the aerial view from the second aerial view region to the first aerial view region for display.

The aerial view is used to display the entire contents of the main image when the main image exceeds the size of the display screen. The aerial view need not be provided when the main image is fully displayed in the display screen when the size of the main image does not exceed the size of the display screen.

In the method for processing the aerial view according to an optional embodiment of the disclosed embodiments, before receiving the first touch-operation instruction directed at the main image on the display screen, the method further includes:
  performed integrity monitoring on the main image to determine whether the main image is fully displayed on the display screen.

The area of the main image may be determined by calculation, and the area of the main image is compared with the area of the display screen. If the area of the main image is smaller than the area of the display screen, it can be determined that the main image is fully displayed on the display screen.

Alternatively, a plurality of boundary identification points may be selected on the boundary of the main image (which may be, for example, four vertices of the main image), and whether the plurality of boundary identification points are all displayed on the display screen is determined in real time. If all the boundary identification points can be displayed on the display screen, it is determined that the main image is fully displayed on the display screen. If a part of the boundary identification points cannot be displayed on the display screen, it means that the main image is partially missing and cannot be fully displayed.

If the main image is fully displayed on the display screen, the aerial view is hidden.

It should be noted that the method according to the embodiments of the present disclosure may be performed by a single device, such as a computer or a server. The method according to the embodiments can also be applied to a distributed scenario, where multiple devices cooperate to perform the method. In the case of such a distributed scenario, one of the plurality of devices may only perform one or more steps of the method according to the embodiments of the present disclosure, and the plurality of devices may interact with each other to perform the described method.

It is noted that some embodiments of the present disclosure have been described above. Other embodiments are within the scope of the following claims. In some cases, the acts or steps recited in the claims may be performed in a different order than in the embodiments described above and still achieve desirable results. Additionally, the processes depicted in the accompanying drawings do not necessarily require to be performed in the particular order shown, or sequential order, to achieve desirable results. Multi-tasking and parallel processing are also possible or may be advantageous in some embodiments.

Based on the same inventive concept, the present disclosure further provides an apparatus for processing an aerial view corresponding to any of the above-described method embodiments.

Figure 5:
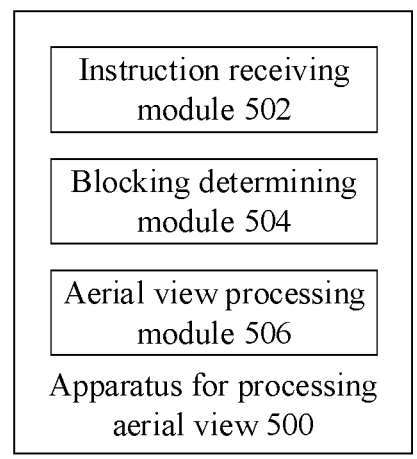
FIG. 5 is a schematic structural diagram of an apparatus for processing an aerial view according to an embodiment of the disclosed embodiments.

Referring to FIG. 5, the apparatus for processing an aerial view processing 500 includes:
  an instruction receiving module 502 configured to receive a first touch-operation instruction directed at a main image on a display screen;
  a blocking determining module 504 configured to determine whether a first touch track corresponding to the first touch-operation instruction enters a blocking-sensable region;
  an aerial view processing module 506 configured to:
    when the first touch track does not enter the blocking-sensable region, provide an aerial view of the main image in a first aerial view region for display; and
    when the first touch track enters the blocking-sensable region, move the aerial view from the first aerial view region to a second aerial view region for display, or hide the aerial view;
  where the blocking-sensable region includes the first aerial view region.

In some embodiments, the blocking determining module 504 is specifically configured to:
  determine boundary coordinate data of the blocking-sensable region;
  determine, on the basis of the first touch-operation instruction, point coordinate data of a plurality of touch points in the first touch track;

compare the point coordinate data with the boundary coordinate data to determine whether any of the touch points is in the blocking-sensable region;

when none of the touch points is in the blocking-sensable region, determine that the first touch track does not enter the blocking-sensable region;

when at least one of the touch points is in the blocking-sensable region, determine that the first touch track enters the blocking-sensable region.

In some embodiments, the second aerial view region is provided in the blocking-sensable region, and a size of the second aerial view region is smaller than a size of the first aerial view region; the aerial view processing module 506 is specifically configured to:

when the first touch track enters the blocking-sensable region, adjust a size of the aerial view to match the size of the second aerial view region so as to move the aerial view from the first aerial view region to the second aerial view region for display.

In some embodiments, the aerial view processing module 506 is specifically configured to:

determine a first movement path of the aerial view on the basis of a position of the first aerial view region and a position of the second aerial view region;

create a first movement animation for the aerial view on the basis of the first movement path, the first movement animation including a plurality of first animation frames, positions of the plurality of first animation frames all being located in the first movement path, sizes of the plurality of the first animation frames decreasing along a first movement path direction, the first movement path direction being a direction from the first aerial view region to the second aerial view region;

move the aerial view from the first aerial view region to the second aerial view region for display on the basis of the positions of the plurality of the first animation frames in the first movement path.

In some embodiments, the apparatus for processing the aerial view 500 is further configured to:

receive a second touch-operation instruction directed at the main image, and determine a corresponding second touch track;

when the second touch track does not enter the blocking-sensable region, adjust the size of the aerial view to match the size of the first aerial view region so as to move the aerial view from the second aerial view region to the first aerial view region for display.

In some embodiments, the apparatus for processing the aerial view 500 is further configured to:

determine a second movement path of the aerial view on the basis of a position of the second aerial view region and a position of the first aerial view region;

create a second movement animation for the aerial view on the basis of the second movement path, the second movement animation including a plurality of second animation frames, positions of the plurality of the second animation frames all being located in the second movement path, sizes of the plurality of the second animation frames increasing along a second movement path direction, the second movement path direction is a direction from the second aerial view region to the first aerial view region;

move the aerial view from the second aerial view region to the first aerial view region for display on the basis of the positions of the plurality of the second animation frames in the second movement path.

In some embodiments, the apparatus for processing the aerial view 500 is further configured to:

receive a touch-move instruction directed at the aerial view, and determine a corresponding touch-move direction;

when the touch-move direction is from the second aerial view region to the first aerial view region, move the aerial view from the second aerial view region to the first aerial view region for display.

In some embodiments, the apparatus for processing the aerial view 500 is further configured to:

perform integrity monitoring on the main image to determine whether the main image is fully displayed on the display screen;

when the main image is fully displayed on the display screen, hide the aerial view.

For ease of description, the above apparatus is described with various modules of different functions being described separately. Of course, the functionality of these modules may be implemented in a same or multiple software application(s) and/or hardware device in practicing the present disclosure.

The apparatus in the above embodiment is configured to implement a corresponding method for processing the aerial view according to any of the above-described embodiments, and has the advantageous effects of corresponding method embodiments, which will not be described in detail herein.

Based on the same inventive concept, correspondingly to any of the method embodiments, the disclosed embodiments further provides an electronic device including a memory, a processor, and a computer program stored on the memory and executable on the processor, where the program, when being executed by the processor, implement the method for processing the aerial view according to any of the above embodiments.

Figure 6:
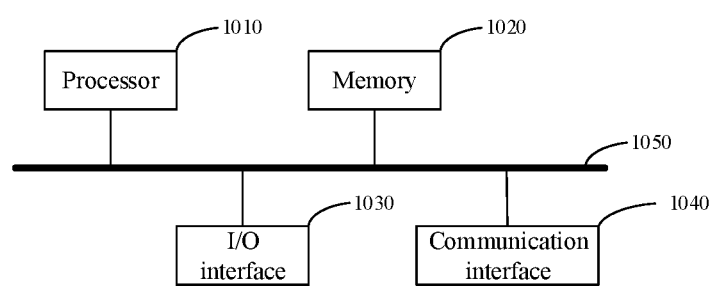
FIG. 6 is a schematic structural diagram of an electronic device according to an embodiment of the disclosed embodiments.

FIG. 6 shows a more specific schematic structural diagram of hardware of an electronic device according to an embodiment of the present disclosure, and the device may include: a processor 1010, a memory 1020, an I/O interface 1030, a communication interface 1040, and a bus 1050. The processor 1010, the memory 1020, the input/output interface 1030, and the communication interface 1040 are communicatively coupled to each other within the device via the bus 1050.

The processor 1010 may be implemented as a general-purpose central processing unit (CPU), a microprocessor, an application specific integrated circuit (ASIC), or one or more integrated circuits for executing the relevant programs to implement the technical solutions provided by the embodiments of the present description.

The memory 1020 may be implemented as a ROM (Read Only Memory), a RAM (Random Access Memory), a static storage device, a dynamic storage device, etc. The memory 1020 may store an operating system and other applications. When the technical solutions provided by the embodiments of this specification is implemented by software or firmware, the relevant program code is stored in the memory 1020 and called and executed by the processor 1010.

The I/O interface 1030 is configured to interface an input/output module to realize input and output of information. The inputs/outputs/module may be provided as components in the device (not shown) or may be external to the device to provide the corresponding functionality. The input device may include a keyboard, a mouse, a touch screen, a microphone, various sensors, etc. and the output device may include a display, a speaker, a vibrator, an indicator lamp, etc.

The communication interface 1040 is configured to interface a communication module (not shown) to enable the device to interact with other devices. The communication module may realize communication through wired mode (such as USB, network cable, etc.), and may also realize communication through wireless mode (such as mobile network, WIFI, bluetooth, etc.).

The bus 1050 includes a path for communicating information between various components of the device, such as the processor 1010, the memory 1020, the I/O interface 1030, and the communication interface 1040.

It should be noted that, although the above device shows only the processor 1010, the memory 1020, the I/O interface 1030, the communication interface 1040, and the bus 1050, in a specific implementation, the device may also include other components necessary to achieve normal operation. Moreover, those skilled in the art will appreciate that, the device described above may include only the components necessary to implement the embodiments of the present disclosure, and may not necessarily include all of the components illustrated in the drawings.

The electronic device according to the above embodiments is configured to implement the corresponding method for processing the aerial view according to any of the above embodiments, and has the advantageous effects of the corresponding method embodiments, which will not be described in detail herein.

Based on the same inventive concept, the disclosed embodiments further provides a non-transitory computer-readable storage medium having computer instructions stored thereon for causing the computer to perform the method for processing the aerial view according to any of the above-described embodiments.

The computer-readable medium according to the present embodiments may include a persistent or non-persistent, a removable or non-removable medium. Information storage may be implemented by any method or technique. The information may be computer readable instructions, data structures, modules of a program, or other data. Examples of the storage medium of the computer may include, but are not limited to, a phase change memory (PRAM), a static random access memory (SRAM), a dynamic random access memory (DRAM), other types of random access memory (RANI), a read only memory (ROM), an electrically erasable programmable read only memory (EEPROM), a flash memory or other memory technology, a compact disc read only memory (CD-ROM), a digital versatile disc (DVD) or other optical storage, magnetic cassettes, magnetic tape magnetic disk storage or other magnetic storage devices or any other non-transmission medium, which may be configured to store information that can be accessed by a computing device.

The storage medium of the above-described embodiments stores computer instructions for causing the computer to execute the aerial view processing method according to any of the above-described embodiments, and has the advantageous effects of the corresponding method embodiments, which will not be described in detail herein.

Those of ordinary skill in the art will appreciate that, the discussion of any of the embodiments above is for illustration only and is not intended to imply that the scope of the application, including the claims, is limited to those example. Combinations of the features in the above embodiments or in different embodiments may also be made within the concept of the disclosed embodiments, the steps may be performed in any order, and there are many other variations of the different aspects of the embodiments of the application described above, which are not provided in detail for the sake of clarity.

In addition, well-known power/ground connections to integrated circuit (IC) chips and other components may or may not be shown in the provided drawings for simplicity of illustration and discussion, and in order not to obscure the embodiments of the disclosed embodiments. Moreover, the apparatus may be shown in block diagram form in order to avoid obscuring the embodiments of the disclosed embodiments, and this takes into account the fact that the details regarding the implementation of such block diagram apparatus are highly dependent upon the platform upon which the embodiments of the disclosed embodiments are to be implemented (that is, such details should be fully within the understanding of one skilled in the art). Where specific details (for example, circuits) are set forth in order to describe example embodiments of the application, it will be apparent to one skilled in the art that the embodiments of the application can be practiced without or with variation of these specific details. Accordingly, the description is to be regarded as illustrative in nature and not as restrictive.

While this application has been described in conjunction with specific embodiments thereof, many alternatives, modifications, and variations will be apparent to those skilled in the art in light of the foregoing description. For example, other memory architectures (e.g., a dynamic RAM (DRAM)) may use the embodiments discussed.

The present embodiments are intended to embrace all such alternatives, modifications and variances which fall within the broad scope of the appended claims. Accordingly, it is intended to embrace all such alternatives, modifications, equivalents, and improvements that fall within the gist and scope of the disclosed embodiments.

What is claimed is:

1. A method for processing an aerial view, comprising:
receiving a first touch-operation instruction directed at a main image on a display screen;
determining whether a first touch track corresponding to the first touch-operation instruction enters a blocking-sensable region;
providing an aerial view of the main image in a first aerial view region for display when the first touch track does not enter the blocking-sensable region;
moving the aerial view from the first aerial view region to a second aerial view region for display or hiding the aerial view when the first touch track enters the blocking-sensable region;
wherein the blocking-sensable region comprises the first aerial view region,
the determining whether a first touch track corresponding to the first touch-operation instruction enters a blocking-sensable region further comprises:
determining boundary coordinate data of the blocking-sensable region;
determining point coordinate data of a plurality of touch points in the first touch track on the basis of the first touch-operation instruction;
comparing the point coordinate data with the boundary coordinate data to determine whether any of the touch points is in the blocking-sensable region;
determining that the first touch track does not enter the blocking-sensable region when none of the touch points is in the blocking-sensable region; and
determining that the first touch track enters the blocking-sensable region when at least one of the touch points is in the blocking-sensable region.

2. The method according to claim 1, wherein the second aerial view region is provided in the blocking-sensable region, and a size of the second aerial view region is smaller than a size of the first aerial view region;
    the moving the aerial view from the first aerial view region to a second aerial view region for display when the first touch track enters the blocking-sensable region comprises:
    adjusting, when the first touch track enters the blocking-sensable region, a size of the aerial view to match the size of the second aerial view region so as to move the aerial view from the first aerial view region to the second aerial view region for display.

3. The method according to claim 2, wherein the adjusting, when the first touch track enters the blocking-sensable region, a size of the aerial view to match the size of the second aerial view region so as to move the aerial view from the first aerial view region to the second aerial view region for display further comprises:
    determining a first movement path of the aerial view on the basis of a position of the first aerial view region and a position of the second aerial view region;
    creating a first movement animation for the aerial view on the basis of the first movement path, the first movement animation comprising a plurality of first animation frames, positions of the plurality of first animation frames all being located in the first movement path, sizes of the plurality of the first animation frames decreasing along a first movement path direction, the first movement path direction being a direction from the first aerial view region to the second aerial view region;
    moving the aerial view from the first aerial view region to the second aerial view region for display on the basis of the positions of the plurality of the first animation frames in the first movement path.

4. The method according to claim 2, wherein after moving the aerial view from the first aerial view region to the second aerial view region for display, the method further comprises:
    receiving a second touch-operation instruction directed at the main image, and determining a corresponding second touch track;
    adjusting, when the second touch track does not enter the blocking-sensable region, the size of the aerial view to match the size of the first aerial view region so as to move the aerial view from the second aerial view region to the first aerial view region for display.

5. The method according to claim 4, wherein the adjusting, when the second touch track does not enter the blocking-sensable region, the size of the aerial view to match the size of the first aerial view region so as to move the aerial view from the second aerial view region to the first aerial view region for display further comprises:
    determining a second movement path of the aerial view on the basis of a position of the second aerial view region and a position of the first aerial view region;
    creating a second movement animation for the aerial view on the basis of the second movement path, the second movement animation comprising a plurality of second animation frames, positions of the plurality of the second animation frames all being located in the second movement path, sizes of the plurality of the second animation frames increasing along a second movement path direction, the second movement path direction being a direction from the second aerial view region to the first aerial view region;
    moving the aerial view from the second aerial view region to the first aerial view region for display on the basis of the positions of the plurality of the second animation frames in the second movement path.

6. The method according to claim 1, wherein after the moving the aerial view from the first aerial view region to a second aerial view region for display, the method further comprises:
    receiving a touch-move instruction directed at the aerial view, and determining a corresponding touch-move direction;
    moving the aerial view from the second aerial view region to the first aerial view region for display when the touch-move direction is from the second aerial view region to the first aerial view region.

7. The method according to claim 1, wherein after the moving the aerial view from the first aerial view region to a second aerial view region for display, the method further comprises:
    receiving a touch-move instruction directed at the aerial view, and determining a corresponding touch-move direction;
    moving the aerial view from the second aerial view region to the first aerial view region for display when the touch-move direction is from the second aerial view region to the first aerial view region.

8. The method according to claim 2, wherein after the moving the aerial view from the first aerial view region to a second aerial view region for display, the method further comprises:
    receiving a touch-move instruction directed at the aerial view, and determining a corresponding touch-move direction;
    moving the aerial view from the second aerial view region to the first aerial view region for display when the touch-move direction is from the second aerial view region to the first aerial view region.

9. The method according to claim 3, wherein after the moving the aerial view from the first aerial view region to a second aerial view region for display, the method further comprises:
    receiving a touch-move instruction directed at the aerial view, and determining a corresponding touch-move direction;
    moving the aerial view from the second aerial view region to the first aerial view region for display when the touch-move direction is from the second aerial view region to the first aerial view region.

10. The method according to claim 4, wherein after the moving the aerial view from the first aerial view region to a second aerial view region for display, the method further comprises:
    receiving a touch-move instruction directed at the aerial view, and determining a corresponding touch-move direction;
    moving the aerial view from the second aerial view region to the first aerial view region for display when the touch-move direction is from the second aerial view region to the first aerial view region.

11. The method according to claim 5, wherein after the moving the aerial view from the first aerial view region to a second aerial view region for display, the method further comprises:
    receiving a touch-move instruction directed at the aerial view, and determining a corresponding touch-move direction;

moving the aerial view from the second aerial view region to the first aerial view region for display when the touch-move direction is from the second aerial view region to the first aerial view region.

12. The method according to claim 1, wherein before the receiving a first touch-operation instruction directed at a main image on a display screen, the method further comprises:
performing integrity monitoring on the main image to determine whether the main image is fully displayed on the display screen;
hiding the aerial view when the main image is fully displayed on the display screen.

13. The method according to claim 1, wherein before the receiving a first touch-operation instruction directed at a main image on a display screen, the method further comprises:
performing integrity monitoring on the main image to determine whether the main image is fully displayed on the display screen;
hiding the aerial view when the main image is fully displayed on the display screen.

14. The method according to claim 2, wherein before the receiving a first touch-operation instruction directed at a main image on a display screen, the method further comprises:
performing integrity monitoring on the main image to determine whether the main image is fully displayed on the display screen;
hiding the aerial view when the main image is fully displayed on the display screen.

15. The method according to claim 3, wherein before the receiving a first touch-operation instruction directed at a main image on a display screen, the method further comprises:
performing integrity monitoring on the main image to determine whether the main image is fully displayed on the display screen;
hiding the aerial view when the main image is fully displayed on the display screen.

16. The method according to claim 4, wherein before the receiving a first touch-operation instruction directed at a main image on a display screen, the method further comprises:
performing integrity monitoring on the main image to determine whether the main image is fully displayed on the display screen;
hiding the aerial view when the main image is fully displayed on the display screen.

17. The method according to claim 5, wherein before the receiving a first touch-operation instruction directed at a main image on a display screen, the method further comprises:
performing integrity monitoring on the main image to determine whether the main image is fully displayed on the display screen;
hiding the aerial view when the main image is fully displayed on the display screen.

18. An apparatus for processing an aerial view, comprising:
an interface circuitry configured to receive a first touch-operation instruction directed at a main image on a display screen;
a processor coupled with the interface circuitry and configured to:
determine whether a first touch track corresponding to the first touch-operation instruction enters a blocking-sensable region;
provide an aerial view of the main image in a first aerial view region for display when the first touch track does not enter the blocking-sensable region; and
move the aerial view from the first aerial view region to a second aerial view region for display or hide the aerial view when the first touch track enters the blocking-sensable region;
wherein the blocking-sensable region comprises the first aerial view region,
the processor is configured to determine whether the first touch track corresponding to the first touch-operation instruction enters the blocking-sensable region by:
determining boundary coordinate data of the blocking-sensable region;
determining point coordinate data of a plurality of touch points in the first touch track on the basis of the first touch-operation instruction;
comparing the point coordinate data with the boundary coordinate data to determine whether any of the touch points is in the blocking-sensable region;
determining that the first touch track does not enter the blocking-sensable region when none of the touch points is in the blocking-sensable region; and
determining that the first touch track enters the blocking-sensable region when at least one of the touch points is in the blocking-sensable region.

19. A non-transitory computer-readable medium comprising instructions stored thereon, wherein the instructions, when executed by a processor, cause the processor to:
determine whether a first touch track enters a blocking-sensable region, the first touch track corresponding to a first touch-operation instruction directed at a main image on a display screen;
provide an aerial view of the main image in a first aerial view region for display when the first touch track does not enter the blocking-sensable region; and
move the aerial view from the first aerial view region to a second aerial view region for display or hiding the aerial view when the first touch track enters the blocking-sensable region;
wherein the blocking-sensable region comprises the first aerial view region,
the instructions, when executed by the processor, cause the processor to determine whether the first touch track enters the blocking-sensable region by:
determining boundary coordinate data of the blocking-sensable region;
determining point coordinate data of a plurality of touch points in the first touch track on the basis of the first touch-operation instruction;
comparing the point coordinate data with the boundary coordinate data to determine whether any of the touch points is in the blocking-sensable region;
determining that the first touch track does not enter the blocking-sensable region when none of the touch points is in the blocking-sensable region; and
determining that the first touch track enters the blocking-sensable region when at least one of the touch points is in the blocking-sensable region.

* * * * *